(12) United States Patent
Shan

(10) Patent No.: US 8,374,904 B2
(45) Date of Patent: Feb. 12, 2013

(54) MARKET FORECASTING

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 12/946,367

(22) Filed: Nov. 15, 2010

(65) Prior Publication Data
US 2012/0123963 A1 May 17, 2012

(51) Int. Cl.
G06Q 10/00 (2012.01)
(52) U.S. Cl. ...................... 705/7.31; 705/7.29
(58) Field of Classification Search .................. 705/7.29, 705/7.31
See application file for complete search history.

(56) References Cited

U.S. PATENT DOCUMENTS

| 6,032,125 | A  | * | 2/2000  | Ando ........................... 705/7.31 |
| 7,080,026 | B2 | * | 7/2006  | Singh et al. .................. 705/7.31 |
| 7,324,955 | B1 |   | 1/2008  | Ford et al. |
| 2004/0015329 | A1 | * | 1/2004 | Shayegan et al. ............. 702/179 |
| 2004/0068413 | A1 | * | 4/2004 | Musgrove et al. ............... 705/1 |
| 2005/0096866 | A1 | * | 5/2005 | Shan et al. .................... 702/179 |
| 2005/0256759 | A1 | * | 11/2005 | Acharya et al. ................. 705/10 |
| 2006/0116920 | A1 | * | 6/2006 | Shan ............................... 705/10 |
| 2009/0024445 | A1 | * | 1/2009 | Shan ............................... 705/10 |
| 2009/0198559 | A1 | * | 8/2009 | Wang et al. ..................... 705/10 |
| 2010/0057525 | A1 |   | 3/2010 | Wagner et al. |
| 2010/0185499 | A1 | * | 7/2010 | Dwarakanath et al. ......... 705/10 |
| 2010/0185555 | A1 |   | 7/2010 | Sivasundaram et al. |
| 2010/0274642 | A1 | * | 10/2010 | Shan et al. ................... 705/14.1 |
| 2012/0030618 | A1 | * | 2/2012 | Leong et al. .................. 715/810 |

FOREIGN PATENT DOCUMENTS

DE 10061108 6/2002
JP 6139227 5/1994

* cited by examiner

Primary Examiner — Jagdish Patel
Assistant Examiner — Kenneth Bartley

(57) ABSTRACT

Methods, machine readable media, and systems for market forecasting are provided. An example of a method for market forecasting includes modeling market characteristics of market participants for a type of product and deriving variability of an attribute corresponding to a market characteristic coefficient of the type of product for each of the market participants. The method includes resampling from a distribution of the variability of the attribute for each of the market participants and remodeling the market characteristics of the market participants for the type of product using the resampled attribute. The method includes forecasting future market characteristics of the market participants for the type of product according to the remodeled market characteristics.

20 Claims, 7 Drawing Sheets

MARKET FORECASTING

BACKGROUND

Market analysis (e.g., market share, market size, etc.) is often performed to allow analysts to better understand effectiveness of various operations (e.g., promotional operations, advertising campaigns, pricing campaigns, etc.) of an enterprise (e.g., business, educational organization, government agency), to detect systematic changes in an enterprise, to determine whether particular products are competing effectively with products of competitors, and to make forecasts with respect to existing products or future products.

DETAILED DESCRIPTION

Figure 1:
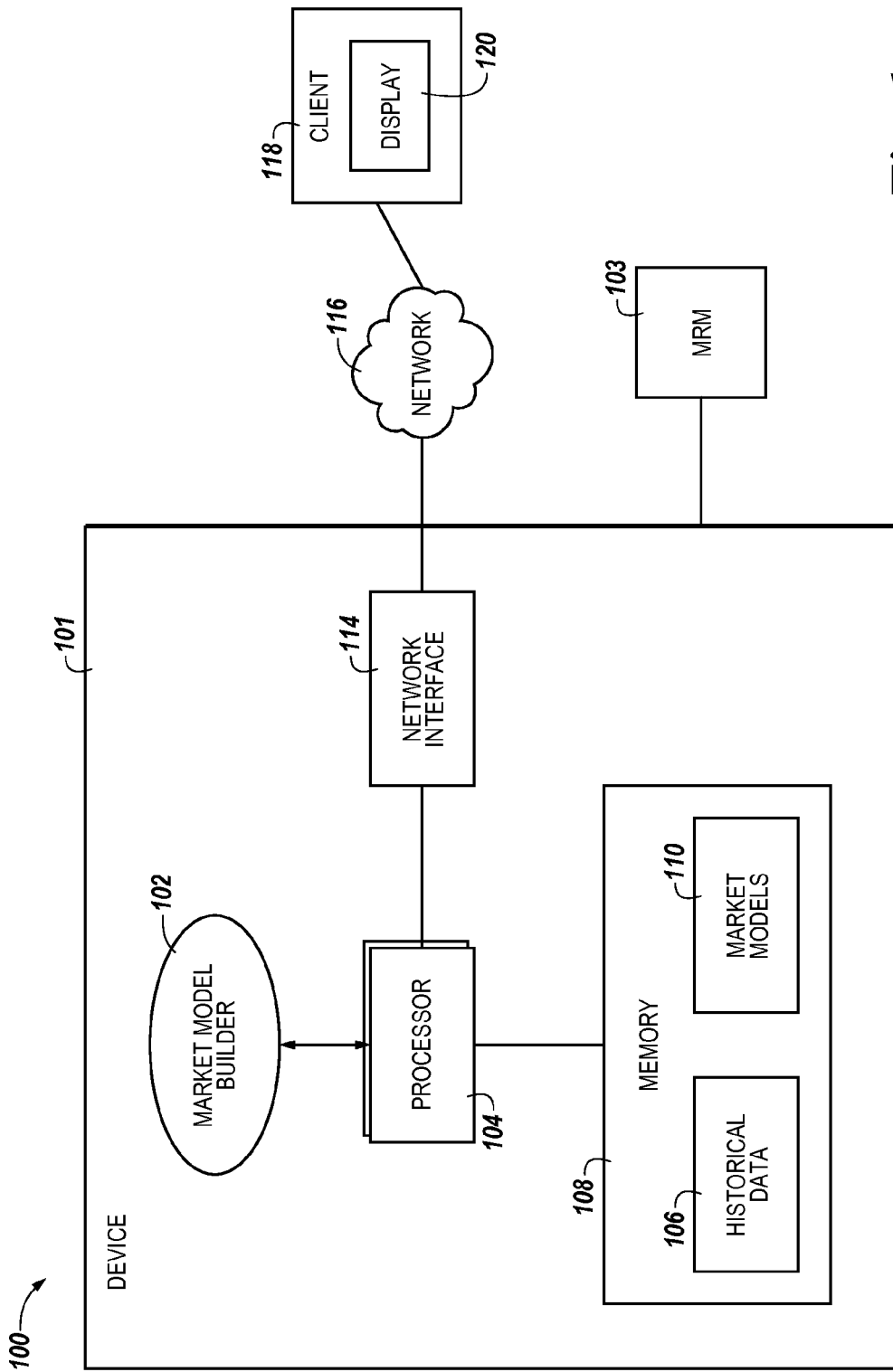
FIG. 1 illustrates a block diagram of an example of a system for market forecasting according to the present disclosure.

The present disclosure provides methods, machine readable media, and systems for market forecasting are provided. An example of a method for market forecasting includes modeling market characteristics of market participants for a type of product and deriving variability of an attribute corresponding to a market characteristic coefficient of the type of product for each of the market participants. The method includes resampling from a distribution of the variability of the attribute for each of the market participants and remodeling the market characteristics of the market participants for the type of product using the resampled attribute. The method includes forecasting future market characteristics of the market participants for the type of product according to the remodeled market characteristics.

For example, the market characteristics can include one or more of market share and/or market size. The attribute can be an average that is specific to each market participant. Accordingly, a variability of the attribute can be derived from its historical data. In some examples, the attribute can be trend-adjusted to arrive at an attribute distribution (e.g., a price distribution). The attribute distribution can be resampled (e.g., using bootstrapping) for each market participant to yield a resampled attribute.

The resampled attribute can be added back to the individual trend, as an attribute input to the market model to forecast market characteristics into the future. Using simulation with recursive sampling (e.g., repeated sampling with replacement if the data is from a set of discrete values, or generating random values from a distribution) and runs, market characteristic distributions can be obtained for a future time period. Point forecasts and confidence interval forecasts can be derived from the market characteristic distributions as points of reference.

For example, the attribute can be average sales price equal to $10 for a particular time period (e.g., a month). The average sales price for the previous month is equal to $12. The standard deviation between the average sales price and a de-trended average sales price for all considered time periods is $2. The variability for a particular time period can therefore have a probability distribution, which is dependent on the standard deviation. A random sample can be drawn from the distribution for a time period. For example, a random sample from the distribution of the previous month is $1.2 and a random sample from the distribution of the particular month is $1. The random sample for a month can be added to the average sales price for the month to result in a pseudo-attribute (e.g., a pseudo-price). Thus, the pseudo-price for the previous month is $13.2 and the pseudo-price for the particular month is $11. These pseudo-prices can be fed back into the market model to arrive at different results (e.g., market characteristics). The resampling can be done repeatedly to arrive at multiple pseudo-prices and therefore multiple results from the model. Such implementations can improve the accuracy of the forecast provided by the model while providing a dynamic measurement of the variability of the attributes over time. Those approaches that rely on using averages may not reflect the variability.

Some previous modeling approaches for performing market analysis, such as discrete choice modeling approaches, use the assumption that attributes (such as a price attribute) do not exhibit a trend change. That assumption may not be valid, since in many competitive markets, product prices can continually decline while capabilities of products are continually being enhanced.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 346 may reference element "46" in FIG. 3, and a similar element may be referenced as 446 in FIG. 4. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a block diagram of an example of a system 100 for market forecasting according to the present disclosure. The system 100 can include a device 101 (e.g., a computing device). The device 101 can include a market model builder 102, which can be implemented in logic and/or in machine readable and executable instructions (e.g., software) executable on one or more processors 104. As input, the market model builder 102 receives historical data 106 stored in a memory resources 108. The historical data 106 can provide information such as historical price information for market participants, historical capacity/capability information for market participants, market characteristic information for the market participants, and/or market size information for the market participants. Based on the historical data 106, the market model builder 102 can build various market models 110, which can be stored in the memory resources 108. The memory resources 108 can include memory addressable by the processor(s) 104 for execution of machine readable instructions. The memory resources can include volatile and/or non-volatile memory such as random access memory (RAM), magnetic memory such as a hard disk, floppy disk, and/or tape memory, a solid state drive (SSD), flash memory, phase change memory, optical memory such as a digital versatile disc (DVD), etc.

A device 101 can include and/or receive a tangible non-transitory machine readable medium ("MRM") 103 storing a set of machine readable instructions (e.g., software) for market forecasting. Although, with respect to FIG. 1, the MRM 103 is illustrated as being external to the device 101, in some examples the MRM 103 can be internal to the device 101. The MRM 103 can be in communication with the processor(s) 104 to execute the instructions stored on the MRM 103. The MRM 103 can include volatile and/or non-volatile memory such as random access memory (RAM), magnetic memory such as a hard disk, floppy disk, and/or tape memory, a solid state drive (SSD), flash memory, phase change memory, optical memory such as a digital versatile disc (DVD), etc.

The market models 110 can be communicated by the device 101 to a remote location, such as through a network interface 114 of the device 101 and over a network 116 to a client device (e.g., computing device) 118. The market models 110 can be presented for display in a display 120 of the client device 118, or a report (e.g., a chart, graph, table, etc.) can be generated based on the market models 110 for presentation in the display 120. Alternatively, a display device can be directly attached to the device 101 to allow for presentation of the market models 110, or for presentation of reports produced based on the market models 110.

As used herein, a "market model" can refer to a market characteristic model (e.g., a market share model and/or a market size model). One example attribute is a price attribute. Examples of other attributes include product features, product availability locations, product capabilities, product capacities, etc. A "market participant" refers to an entity that can be chosen by a consumer of goods or services. One example of a market participant is a product that consumers can purchase. Thus, in competitive market multiple products may be offered by various competing enterprises (e.g., businesses, educational organizations, government agencies), from which the consumer can make a choice when purchasing. Another example of a market participant is a service that can be offered by an enterprise. A market participant can also refer to the enterprise itself. Thus, in this latter example, a market can include several competing enterprises that sell competing products and/or services (e.g., commercial products and/or services, educational offerings, government services, etc.).

Market models can be used to perform an analysis of market shares (expressed as percentages) of competing participants. Market size models can be used to perform an analysis of market sizes (expressed in terms of amount, such as total revenue, total profit, etc., of each market participant) of competing market participants. A market size model can refer to a model that represents market demand (expressed in terms of units of a good or service, revenue, etc.) for the market participant. Market share and/or market size models can also be used by analysts to perform forecasting for existing products or for future products.

To provide more accurate market models (e.g., market share models and/or market size models), trends of underlying attributes can be considered when building the market share models and/or market size models. A "trend" in an attribute can refer to some tendency of values of the attribute to increase, decrease, or stay constant. A trend of the attribute can change, which means that attribute values can exhibit differing trends in different time intervals. For example, a trend can change over time.

One example of a trend is a change in price over time. With consumer electronic products, for example, price may decline over the life of each of the products. Another consideration of consumer electronic products is that capacities and capabilities of such products tend to increase while prices decrease. Personal computers provide a good example of this changing trend, where the prices of personal computers that are introduced into the market decrease over the life cycles of the computers while processor speeds and memory capacities of the computers increase. Another example of electronic products that exhibit pricing declines with increasing capacities are storage products, such as memory chips, hard disk drives, flash memory devices, etc.

By taking into account the trend (or change in trend) of one or more attributes associated with various choices (representing market participants) that are available in a market allows for the building of more accurate market models. Market share and/or market size models can be built for both individual market participants and the overall market in the environment of attribute(s) exhibiting trend change.

Figure 2:
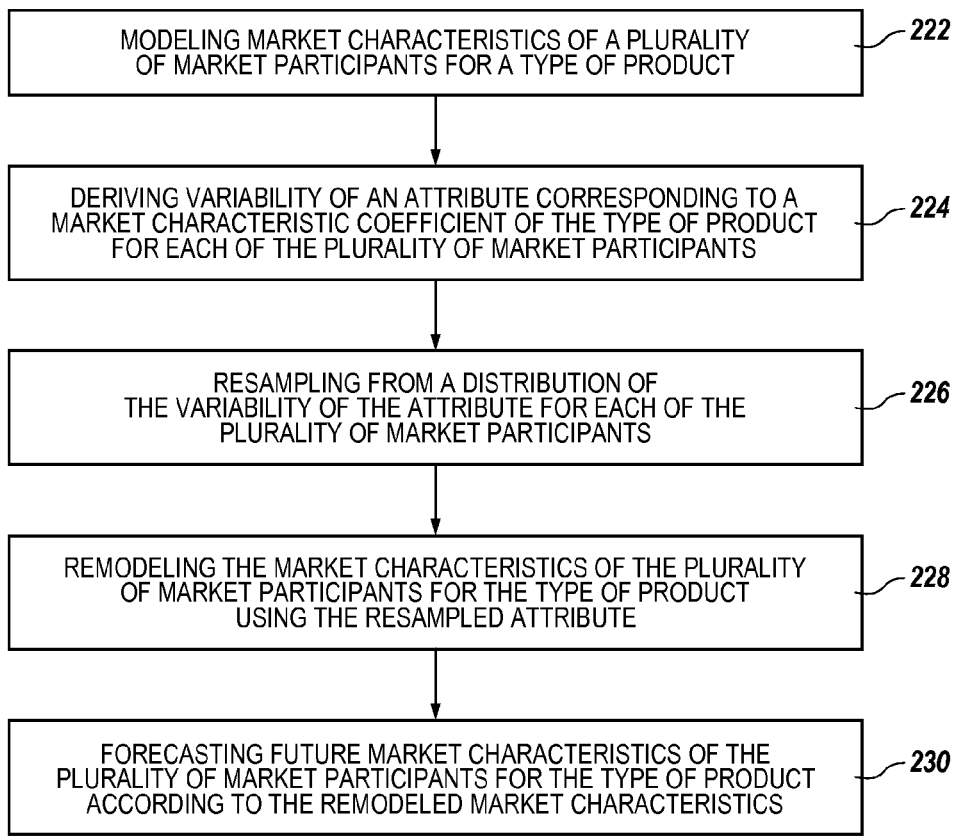
FIG. 2 provides a block diagram illustrating an example of a method for market forecasting according to the present disclosure.

FIG. 2 provides a block diagram illustrating an example of a method for market forecasting according to the present disclosure. The method can include modeling market characteristics of a plurality of market participants for a type of product at block 222. In some examples, market characteristics can be modeled for each of a plurality of time periods. Historical data can be used to estimate parameters (e.g., market characteristic coefficients, attributes corresponding to market characteristic coefficients, etc.) in the model of market characteristics. Modeling market characteristics can include estimating the market characteristic coefficient using historical market characteristic data and historical attribute data.

A market model can be based on a conditional logit model. Utility is a measure of happiness and satisfaction gained from a product or service. Therefore, utility is closely related to a product's attributes (e.g., sales price). Despite the quantitative nature of attributes, utility cannot be fully captured and measured, as there are other factors (e.g., random factors) such as personal preferences and tastes affecting the perceived worthiness of the product or service. Accordingly, utility can be measured by two addends: expected utility and random utility. Maximum utility theory suggests that a customer chooses a particular product or service from a choice list based on the perceived maximum utility of the choice. When the random utility is assumed to have the extreme value distribution, the probability of a generic customer choosing a particular brand product, which is the market share for the brand, will have a conditional logit model or multinomial logit model.

Suppose there are K+1 choices (representing market participants) of a particular type of product (e.g., computers, printers, etc.) from which a consumer can choose. One of the choices is defined as the base or the reference choice, and the other K choices are defined as the alternative choices. For each choice, we denote its market share by $p_k$, and model it by $p_k = f_k(\vec{x})$, where $f_k(\vec{x})$ is a function based on a vector $\vec{x}$ that contains explanatory variables.

In one example, product prices are considered the drivers for market share so that the price attributes of the K+1 competing choices are used as explanatory variables. An attribute is considered a driver for a market characteristic if the attribute affects the market characteristic. Therefore, the number of attributes M=K+1 and the list of the explanatory variables $\vec{x}$=(itc, $x_0, x_1, x_2, \ldots, x_K$), where itc is the intercept term and is equal the value "1" in an example, and $x_0, x_1, x_2, \ldots, x_K$ are the price attributes of corresponding choices 0, 1, 2, ..., K (e.g., $x_0$ is the price attribute for choice 0, $x_1$ is the price attribute for choice 1, and so forth). The intercept term itc measures the combined effect of all of the explanatory or independent variables when they take the value of zero in the response or dependent variable. The order of choices does not matter, and they can be labeled by the corresponding indices for the market share model $p_k$ (k=0, 1, 2, ..., K). In some examples, the objective for demand modeling is to find the best $f_k(\vec{x})$ for al the choices.

If other attributes are also key drivers for the product demand, they can also be included in the explanatory variables vector, $\vec{x}$. Thus, for example, if there are two attributes that are drivers for product demand among K+1 choices, then the explanatory variables list $\vec{x}$ can be expressed as (itc, $x_0, x_1, \ldots, x_K, x_{K+1}, \ldots, x_{2K+1}$), where $x_{K+1}$ to $x_{2K+1}$ are the variables for the second attribute. More generally, if N attributes (or drivers) are considered for K+1 choices, then the total number of explanatory variables in $\vec{x}$, including the intercept term, is N*(K+1)+1.

The market share models are expressed with the following mathematical constructs. K coefficient vectors $\vec{\beta}_k$ (k=1, 2, ... K) are provided, where each $\vec{\beta}_k$ coefficient vector corresponds to a respective one of the alternative choices 1 to K. A $\vec{\beta}_k$ coefficient vector is not defined for the base choice (k=0). Each $\vec{\beta}_k$ is a vector of 1+(K+1)=K+2 components, where the first component is for the intercept term, and the other K+1 components are for the K+1 choices. The elements of the $\vec{\beta}_k$ coefficient vector include $\vec{\beta}_k(itc), \beta_k(0), \beta_k(1)$, up to $\vec{\beta}_k(K)$. The coefficient $\beta_k(0)$ represents the relative market share of choice k to choice 0 if all choices set their attribute value (e.g., price) to zero. The coefficient $\beta_k(1)$ represents the net effect of unit price change of choice 1 (while the prices of other choices remain fixed) on the relative share of choice k to choice 0. The other coefficients $\beta_k(j)$, j=1 to K, have similar interpretations.

A model $p_0$ represents the model far the base or reference choice, while model $p_k$ represents the model for choice k (k=1 to K). Models $p_0$ and $p_k$ are defined by Eq. 1 below:

$$\begin{cases} p_0 = f_0(\vec{x}) = \dfrac{1}{1 + \sum_{j=1}^{K} \exp(\vec{\beta}_j' \vec{x})}, \\ p_k = f_k(\vec{x}) = \dfrac{\exp(\vec{\beta}_k' \vec{x})}{1 + \sum_{j=1}^{K} \exp(\vec{\beta}_j' \vec{x})} \text{ (for } k = 1, \ldots, K). \end{cases} \quad \text{(Eq. 1)}$$

Eq. 1 provides multilogit demand models. In other examples, other types of market share models can be used. In Eq. 1, $\vec{\beta}_k'$ represents the transpose of $\vec{\beta}_k$, and $\vec{\beta}_k' \vec{x}$ is the inner product of vectors $\vec{\beta}_k$ and $\vec{x}$. Each component of a $\vec{\beta}_k$ vector represents a market share coefficient that is to be multiplied with a corresponding attribute on $\vec{x}$. If the attribute considered for building the market share models $p_0, p_1, \ldots, p_k$ is the price attribute, then $\vec{x}$ contains the K+1 prices for the K+1 choices.

Figure 3:
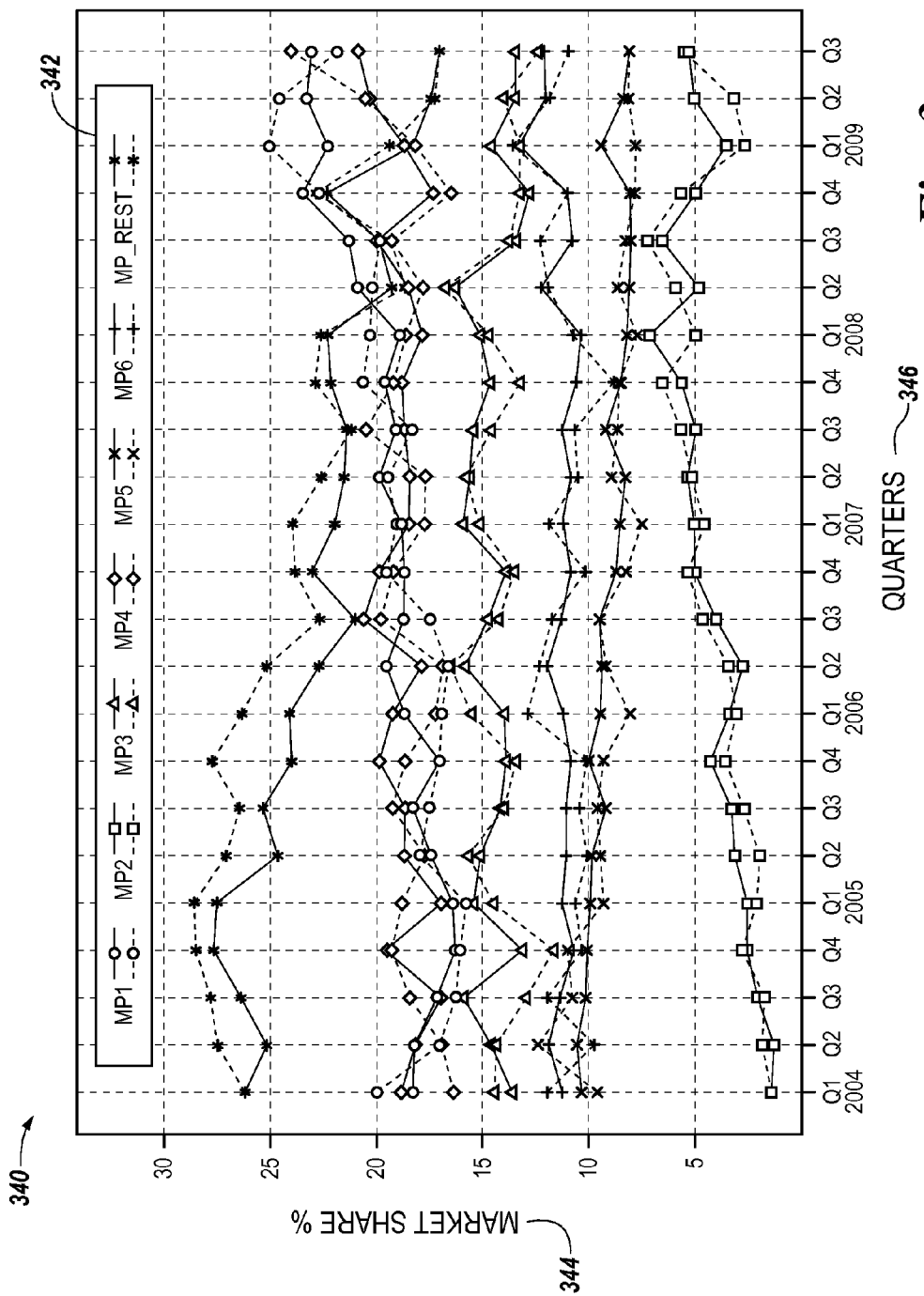
FIG. 3 provides a chart illustrating an example of a market characteristic versus time period for a number of market participants including historical data and modeled data according to the present disclosure.

From the historical data (e.g., historical data 106 illustrated in FIG. 1), the prices of $\vec{x}$ are known, and $p_0, p_1, \ldots, p_k$ are known. From the historical data, the market share coefficients in the $\vec{\beta}_j$ vectors are computed based on historical data, the market share models of Eq. 1 can be used to determine $p_0, p_1, \ldots, p_k$ for other $\vec{x}$ values. In some examples, historical data can be obtained from public data sources. FIG. 3 provides a chart illustrating an example of a market characteristic versus time period for a number of market participants including historical data and modeled data according to the present disclosure and is described in more detail below.

The following describes definitions for market size (demand) models, denoted by $D_j$ (j=0, 1, ... K), which represents the total unit demands for the reference choice and the other K choices, respectively. $D=D_0+D_1+ \ldots +D_K$ is the total market size, which can also to be modeled.

For example, if a multinomial logit model framework is used, the following relationship can be derived for j=1, 2, ..., K:

$$\frac{D_j}{D_0} = \exp(\vec{\beta}_j' \vec{x}). \quad \text{(Eq. 2)}$$

According to Eq. 2, it suffices to model $D_0$, since Eq. 2 allows other models $D_j$ (j=1 to K) to be readily derived once $D_0$ is known. For example, a log-linear model that correlates the unit demand for the reference choice (choice 0) with the available attributes set $\vec{x}$ is used. This set $\vec{x}$ can be the price attribute set (e.g., average sales prices, ASPs) of all the pertinent K+1 competing choices, similar to $\vec{x}$ discussed above for the market share models. The log-linear model for $D_0$ is expressed as:

$$\log(D_0) = \gamma_{itc} + \gamma_0 x_0 + \ldots + \gamma_K x_K = \vec{\gamma}' \vec{x}. \quad \text{(Eq. 3)}$$

In Eq. 3, $\gamma_{itc}, \gamma_0, \gamma_1, \ldots, \gamma_K$ represents the market size (demand) coefficients that are to be multiplied with respective price attributes itc (which is the intercept term equal to one), $x_0, x_1, \ldots, x_K$. The market size coefficient $\gamma_1$ represents the effect on demand for choice 0 in response to unit price change for choice 1 while assuming the prices for other choices remain fixed; market size coefficient $\gamma_2$ represents the effect on demand for choice 0 in response to unit price change for choice 2 while assuming the prices for other choices remain fixed; and so forth. Equivalently, $$D_0 = \exp(\gamma_{itc} + \gamma_0 x_0 + \ldots + \gamma_K x_K) = \exp(\vec{\gamma}\,'\vec{x}). \quad \text{(Eq. 4)}$$

The model for the total market size D then is:

$$\begin{aligned} D &= D_0 + D_1 + \ldots + D_K \quad \text{(Eq. 5)} \\ &= D_0 + \sum_{j=1}^{K} \left(\exp(\vec{\beta}_j'\vec{x})D_0\right) \\ &= D_0\left(1 + \sum_{j=1}^{K} \exp(\vec{\beta}_j'\vec{x})\right) \\ &= \exp(\vec{\gamma}\,'\vec{x})\left(1 + \sum_{j=1}^{K} \exp(\vec{\beta}_j'\vec{x})\right). \end{aligned}$$

Note the parameter vector $\vec{\gamma} = (\gamma_{itc}, \gamma_0, \gamma_1, \ldots \gamma_K)$ for the market size model is also of length K+2, the same as each of the $\vec{\beta}_k$ parameter vectors for the market share models, if the intercept term is included in the market size model. Alternatively, the intercept term can be excluded in the market size model, and in that case, $\vec{\gamma} = (\gamma_0, \gamma_1, \ldots, \gamma_K)$ is of length K+1, instead of the same length as each of $\vec{\beta}_k$. In other embodiments, other types of market size model definitions can be used.

The method can include deriving variability of an attribute corresponding to a market characteristic coefficient of the type of product for each of the plurality of market participants at block 224. In some examples, the variability of the attribute can be derived for each of a plurality of time periods. Deriving the variability of the attribute can include de-trending an average attribute time series associated with historical data for each of the plurality of market participants. Deriving the variability of the attribute can include determining a trend of the attribute for each of the plurality of market participants.

Determining the trend can include applying a linear regression to the average attribute time series. FIG. 4B provides a chart illustrating an example of attribute value versus time period for a particular market participant including historical data with an indicated trend according to the present disclosure and is described in more detail below.

Determining a trend can include using a Holt-Winters algorithm. According to the present disclosure, attributes (e.g., average sales price) can be forecast for a particular product using time series methods such as a Holt-Winters algorithm (e.g., triple exponential smoothing, etc.), an auto regressive integrated moving average (ARIMA), and other time series methods.

For example, a Holt-Winters algorithm can be used to smooth data that shows both a trend and seasonality (e.g., periodicity). An example of a Holt-Winters algorithm is given by:

$$S_t = \alpha \frac{y_t}{I_{t-L}} + (1-\alpha)(S_{t-1} + b_{t-1})$$

$$b_t = \gamma(S_i - S_{t-1}) + (1-\gamma)b_{t-1}$$

-continued $$I_t = \beta \frac{y_t}{S_t} + (1-\beta)I_{t-L}$$

$$F_{t+m} = (S_t + mb_t)I_{t-L+m}$$

where y is the observation, S is the de-trended observation, b is the trend factor, I is the seasonal index, F is the forecast at m periods ahead, t is an index denoting a time period, and $\alpha$, $\beta$, and $\gamma$ are constants that can be estimated to minimize the mean squared error. The present disclosure is not limited to this example of a Holt-Winters algorithm, as others may be used.

For example, an ARIMA model can be applied to data that sows evidence of non-stationarity (e.g., data that shows a trend), where an initial differencing step can be applied to remove the non-stationarity. As used herein, non-stationarity indicates that a probability distribution changes when shifted in time, which can also lead to a change in a mean and/or variance over time. An example of an ARIMA model is given by:

$$\left(1 - \sum_{i=1}^{p} \alpha_i L^i\right) X_t = \left(1 + \sum_{i=1}^{q} \theta_i L^i\right)\varepsilon_t$$

where $X_t$ is a time series of data including real numbers, t is an integer index, L is the lag operator, $\alpha_i$ are the parameters of the autoregressive part of the model, the $\theta_i$ are the parameters of the moving average port and the $\varepsilon_t$ are error terms. The present disclosure is not limited to this example of an ARIMA model, as others may be used.

The method can include resampling from a distribution of the variability of the attribute for each of the plurality of market participants at block 226. Some examples can include resampling (e.g., recursively resampling) from the distribution of the variability of the attribute for each of a plurality of time periods. Resampling can include calculating a difference between the trend of the attribute and the average attribute time series and bootstrapping from the difference between the trend of the attribute and the average attribute time series (e.g., when determining the trend includes applying a linear regression to the average attribute time series).

Bootstrapping can include estimating properties of an estimator (e.g., a variance) by measuring those properties when sampling form an approximating distribution (e.g., an empirical distribution of observed data). Bootstrapping can include randomly resampling from sampled data a plurality of times to obtain alternate versions of an otherwise single statistic (e.g., if the sample were used as a whole). Bootstrapping can allow for an estimate of a distribution of a statistic. The present disclosure is not limited to these examples of bootstrapping.

Resampling can include calculating a standard deviation between the average attribute time series associated with historical data and the trend of the attribute. A mean between the average attribute time series associated with historical data and the trend of the attribute can be calculated. The mean can be added to the standard deviation to create a sum on which a Gaussian distribution can be imposed. Thereafter, resampling can include parametrically resampling from the Gaussian distribution.

Resampled attributes (e.g., as resampled by any of a number of methods) can be added to the trend of the attribute to determine a pseudo-attribute. As described herein, remodeling the market characteristics can include the use of the pseudo-attribute.

The method can include remodeling the market characteristics of the plurality of market participants for the type of product using the resampled attribute at block 228. Some examples can include remodeling the market characteristics for each of a plurality of time periods. In some examples, remodeling the market characteristics of the plurality of market participants for the type of product can include using recursively resampled attributes. In such examples, market characteristic distributions can be derived based on the remodeled market characteristics.

When such data is available, remodeling the market characteristics can include inputting a planned future attribute or planned future attribute range (e.g., price range). For example, a particular market participant may know its planned future attributes or attribute ranges. Likewise, a particular market participant may have access to market intelligence including information about another market participant's planned future attribute or attribute ranges.

Figure 6:
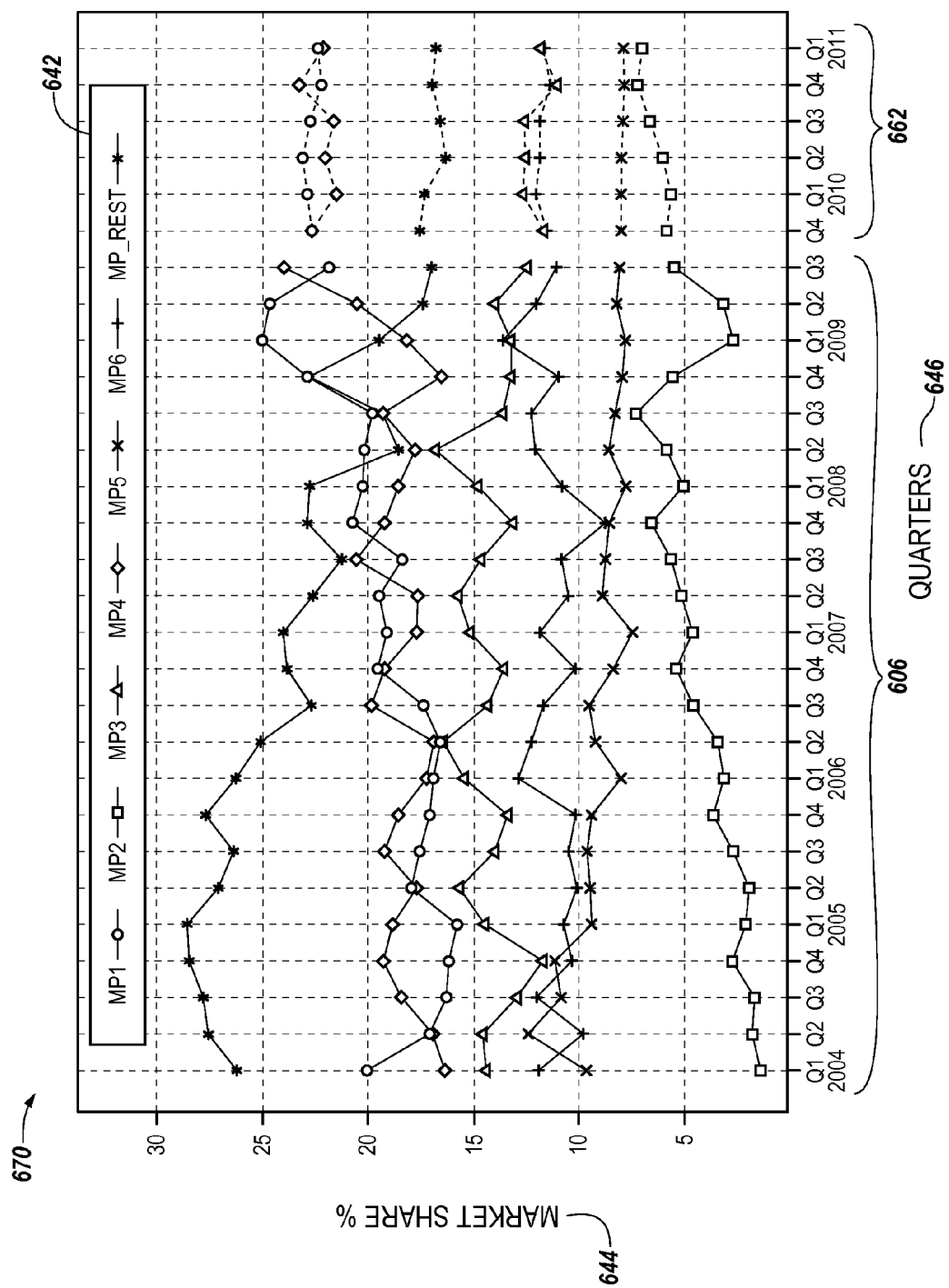
FIG. 6 provides a chart illustrating an example of a market characteristic versus time period for a number of market participants including historical data and modeled forecast data according to the present disclosure.

The method can include forecasting future market characteristics of the plurality of market participants for the type of product according to the remodeled market characteristics at block 230. Some examples can include forecasting future market characteristics for a plurality of time periods. FIG. 6 provides a chart illustrating an example of a market characteristic versus time period for a number of market participants including historical data and modeled forecast data according to the present disclosure and is described in more detail below.

FIGS. 3-6 below provide charts that illustrate a graphical example of market forecasting according to the present disclosure. FIGS. 3-6 are intended to illustrate an example implementation of the present disclosure rather than a limitation thereof, as market forecasting can be used in other implementations.

FIG. 3 provides a chart 340 illustrating an example of a market characteristic (e.g., market share) 344 versus time period 346 for a number of market participants 342 including historical data and modeled data according to the present disclosure. The legend at the top of the chart 340 includes a listing of market participants 342 (e.g., MP1, MP2, MP3, MP4, MP5, MP6, and MP_Rest). "MP_Rest" is a "market participant" representative of all other participants in the market besides MP1-MP6. Examples of the present disclosure are not limited to a particular number or range of market participants unless otherwise explicitly stated.

For example, a market share 344 can be expressed as a percent of the market. For example, the time periods 346 can include quarters (e.g., 04Q1 can represent the first quarter of 2004).

The chart 340 includes historical data (e.g., from 04Q1-09Q3) for each of the market participants 342 as indicated with the solid lines for each market participant 342. The chart 340 also includes modeled data for each of the market participants 342 as indicated by the dashed line for each market participant 342. For example, the modeled data can correspond to values derived from modeling market characteristics of a plurality of market participants 342 for a type of product (e.g., as described above related to modeling at block 222 with respect to FIG. 2).

Figure 4A:
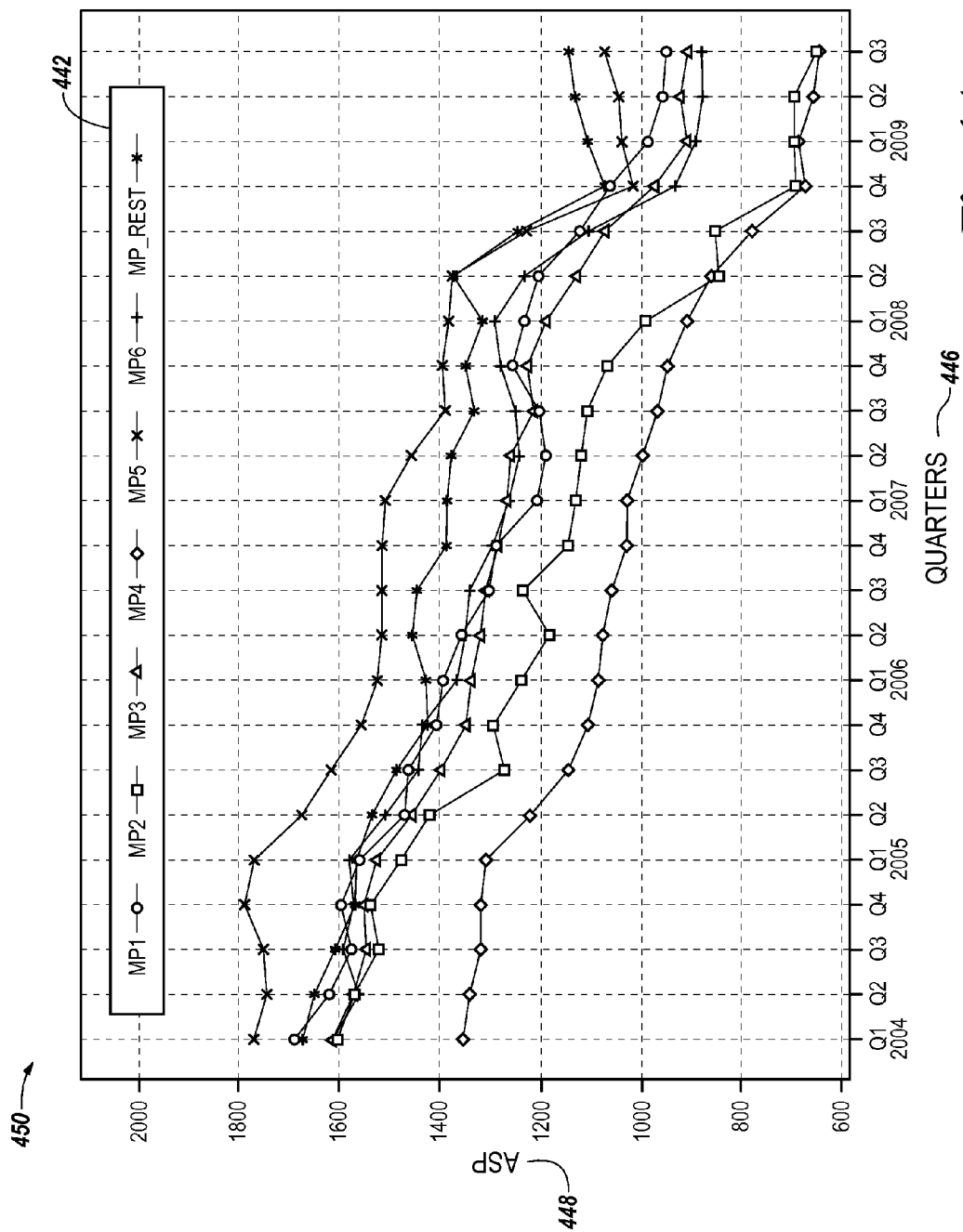
FIG. 4A provides a chart illustrating an example of attribute value versus time period for a number of market participants including historical data according to the present disclosure.
Figure 4B:
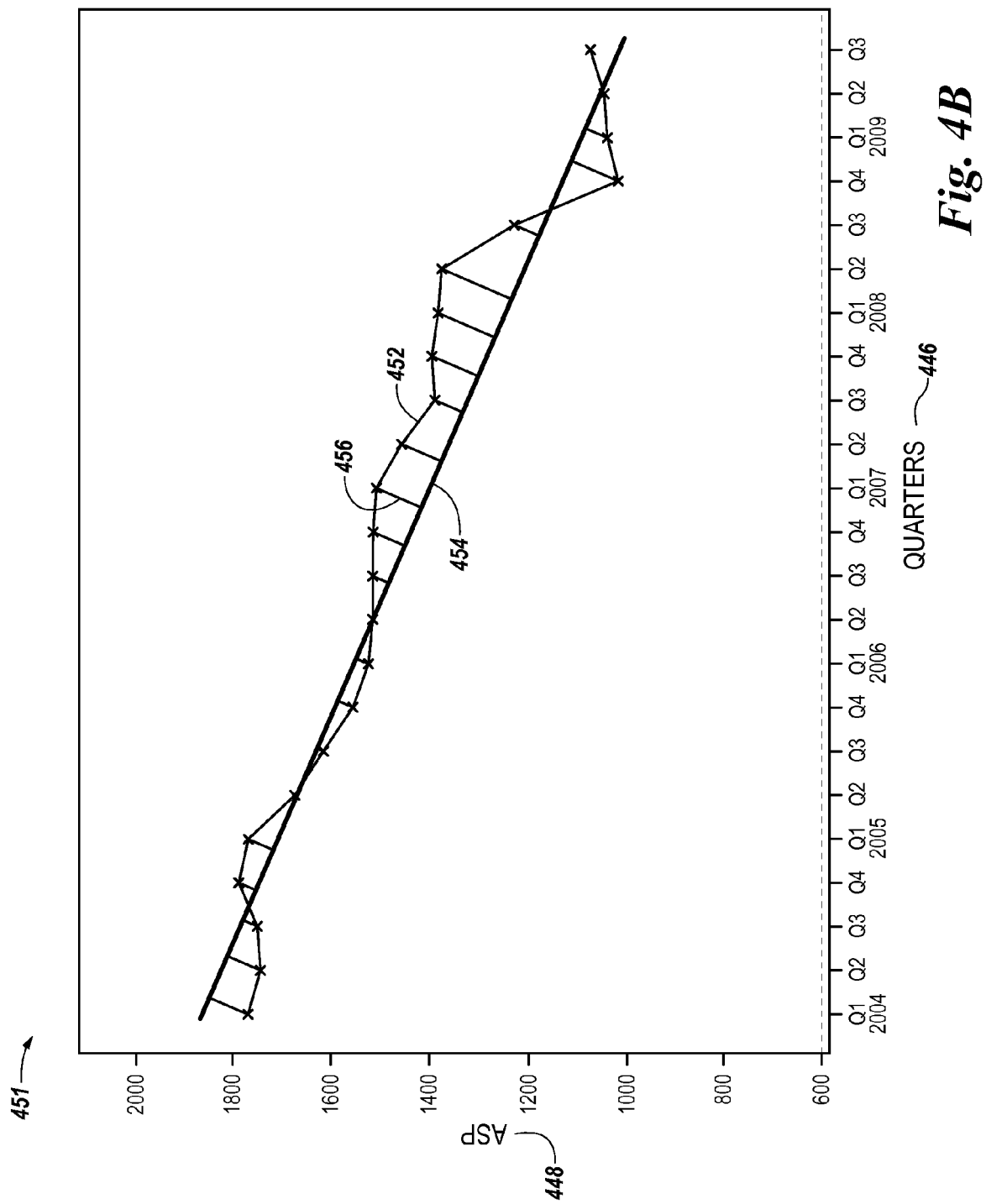
FIG. 4B provides a chart illustrating an example of attribute value versus time period for a particular market participant including historical data with an indicated trend according to the present disclosure.

FIG. 4A provides a chart 450 illustrating an example of attribute value 448 versus time period 446 for a number of market participants 442 including historical data according to the present disclosure. For example, the attribute value 448 can represent an ASP of the particular product (e.g., laptop computers). The market participants 442 (e.g., MP1, MP2, MP3, MP4, MP5, MP6, and MP_Rest) can correspond to the market participants 342 illustrated in FIG. 3.

The chart 450 includes historical data (e.g., from 04Q1-09Q3) for each of the market participants 442 as indicated with the solid lines for each market participant 442. As can be seen from the chart 450, the attribute value 448 for all of the market participants 442 includes a downward trend over the time periods 446. Computing attribute variability without de-trending, in such examples, will not yield accurate results. For example, the variability would be dominated by the effect of the trend and would not reflect the true variability of the attribute.

FIG. 4B provides a chart 451 illustrating an example of attribute value 448 versus time period 446 for a particular market participant including historical data with an indicated trend 454 according to the present disclosure. The particular market participant's historical data is represented by line 452, which corresponds to the historical data for market participant MP5 as illustrated in FIG. 4A. The trend 454 of the attribute 448 can be calculated according to a linear regression (e.g., as illustrated here) or another method as described above.

The lines 456 represent the attribute distribution (e.g., price distribution) between the trend 454 and the historical data 452 (e.g., as described above related to deriving variability at block 224 with respect to FIG. 2). As described herein, the attribute 448 can be resampled (e.g., as described above related to resampling at block 226 with respect to FIG. 2) from the distribution and added back to the trend 454 to yield a pseudo-attribute, which can be fed back into the market model. As described herein, such resampling can be done recursively to provide a rich data set that can be used in remodeling the market characteristics (e.g., as described above related to remodeling at block 228 with respect to FIG. 2).

Figure 5:
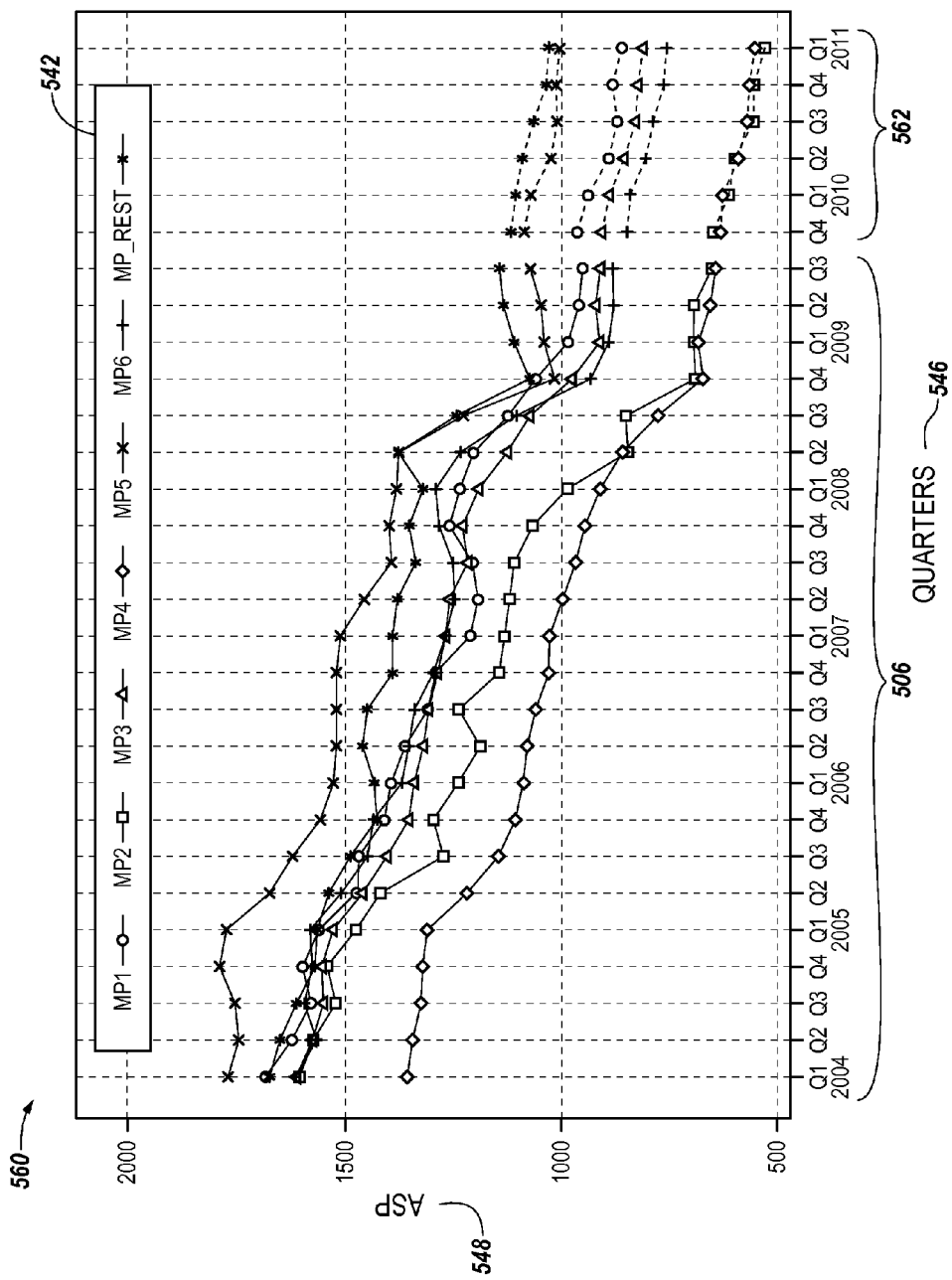
FIG. 5 provides a chart illustrating an example of attribute value versus time period for a number of market participants including historical data and modeled forecast data according to the present disclosure.

FIG. 5 provides a chart 560 illustrating an example of attribute value 548 versus time period 546 for a number of market participants 542 including historical data 506 and modeled forecast data 562 according to the present disclosure. The market participants 542 (e.g., MP1, MP2, MP3, MP4, MP5, MP6, and MP_Rest) can correspond to the market participants 342 illustrated in FIG. 3.

As described herein, the modeled forecast data 562 can be obtained from the remodeled market model according to the resampled attribute. Furthermore, as described herein, the modeled forecast data 562 can include planned future attributes or planned future attribute ranges, when such information is available.

FIG. 6 provides a chart 670 illustrating an example of a market characteristic (e.g., market share) 644 versus time period 646 for a number of market participants 642 including historical data 606 and modeled forecast data 662 according to the present disclosure. The market participants 642 (e.g., MP1, MP2, MP3, MP4, MP5, MP6, and MP_Rest) can correspond to the market participants 342 illustrated in FIG. 3. As described herein, the modeled forecast data 662 can be obtained from the remodeled market model according to the resampled attribute. Forecasting can be related to the forecasting described above at block 230 with respect to FIG. 2.

Market forecasting according to the present disclosure can be advantageous over non-systematic ad-hoc approaches in forecasting market characteristics. The use of simulation and statistical resampling methods in addressing variability issues in attributes can provide a more robust and stable forecast for market characteristics.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A machine-implemented method for market forecasting, comprising:
   modeling, via the machine, a market characteristic for each of a plurality of market participants for a type of product;
   deriving, via the machine, variability of an attribute corresponding to a market characteristic coefficient of the type of product for each of the plurality of market participants, wherein deriving variability of the attribute includes de-trending an average attribute time series associated with historical data for each of the plurality of market participants;
   recursively sampling, via the machine, from a distribution of the variability of the attribute for each of the plurality of market participants;
   determining, via the machine, a pseudo-attribute by adding the recursively sampled attribute to a trend of the attribute;
   remodeling, via the machine, the market characteristic for each of the plurality of market participants for the type of product using the pseudo-attribute as an input to the modeled market characteristic; and
   forecasting, via the machine, a future market characteristic for each of the plurality of market participants for the type of product according to the remodeled market characteristic.

2. The method of claim 1, wherein:
   remodeling the market characteristic for each of the plurality of market participants for the type of product includes using the recursively sampled attributes; and
   wherein the method further includes deriving market characteristic distributions based on the remodeled market characteristic.

3. The method of claim 1, wherein the method includes modeling the market characteristic for a first plurality of time periods, deriving variability of the attribute for each of the first plurality of time periods, recursively sampling from the distribution of the variability of the attribute for each of the first plurality of time periods, remodeling the market characteristic for each of the first plurality of time periods, and forecasting a future market characteristic for a second plurality of time periods.

4. The method of claim 1, wherein modeling the market characteristic includes estimating the market characteristic coefficient using historical market characteristic data and historical attribute data.

5. The method of claim 1, wherein deriving variability of the attribute includes determining a trend of the attribute for each of the plurality of market participants.

6. The method of claim 5, wherein:
   determining the trend includes applying a linear regression to the average attribute time series; and
   recursively sampling from the distribution of the variability of the attribute for each of the plurality of market participants includes:
      calculating a difference between the trend of the attribute and the average attribute time series; and
      bootstrapping from the difference between the trend of the attribute and the average attribute time series.

7. The method of claim 5, wherein:
   determining the trend includes using a Holt-Winters algorithm; and
   recursively sampling from the distribution of the variability of the attribute for each of the plurality of market participants includes:
      calculating a standard deviation between the average attribute time series associated with historical data and the trend of the attribute;
      calculating a mean between the average attribute time series associated with historical data and the trend of the attribute;
      calculating a sum by adding the mean to the standard deviation;
      imposing a Gaussian distribution on the sum; and
      parametrically sampling from the Gaussian distribution.

8. The method of claim 1, wherein remodeling the market characteristic for each of the plurality of market participants for the type of product using the recursively sampled attribute includes inputting a planned future attribute or planned future attribute range.

9. The method of claim 1, wherein the market characteristic comprises one or more of market share and market size.

10. A machine readable non-transitory medium storing a set of instructions for market forecasting executable by the machine to cause the machine to:
    model a market characteristic for each of a plurality of market participants for a type of product over a plurality of time periods;
    derive variability of an attribute corresponding to a market characteristic coefficient of the type of product for each of the plurality of market participants, wherein deriving variability of the attribute includes de-trending an average attribute time series associated with historical data for each of the plurality of market participants;
    recursively sample from a distribution of the variability of the attribute for each of the plurality of market participants;
    determine a pseudo-attribute by adding the recursively sampled attribute to a trend of the attribute;
    remodel the market characteristic for each of the plurality of market participants for the type of product using the pseudo-attribute as an input to the modeled market characteristic; and
    forecast a future market characteristic for at least an additional time period for each of the plurality of market participants for the type of product according to the remodeled market characteristic.

11. The medium of claim 10, wherein the market characteristic comprises one or more of market share and market size.

12. The medium of claim 10, wherein the instructions for market forecasting are executable by the machine to cause the machine to:
    derive variability of the attribute including determining a trend of the attribute for each of the plurality of market participants;
    determine the trend includes applying a linear regression to the average attribute time series; and
    recursively sample from the distribution of the variability of the attribute for each of the plurality of market participants including:
       calculating a difference between the trend of the attribute and the average attribute time series; and
       bootstrapping from the difference between the trend of the attribute and the average attribute time series.

13. The medium of claim 10, wherein the instructions for market forecasting are executable by the machine to cause the machine to:
- derive variability of the attribute including determining a trend of the attribute for each of the plurality of market participants;
- determine the trend includes using a Holt-Winters algorithm; and
- recursively sample from the distribution of the variability of the attribute for each of the plurality of market participants including:
  - calculating a standard deviation between the average attribute time series associated with historical data and the trend of the attribute;
  - calculating a mean between the average attribute time series associated with historical data and the trend of the attribute;
  - calculating a sum by adding the mean to the standard deviation;
  - imposing a Gaussian distribution on the sum; and
  - parametrically sampling from the Gaussian distribution.

14. A system for market forecasting, comprising:
a computing device including:
  one or more processors;
  memory resources coupled to the one or more processors; and
  a market model builder;
wherein the market model builder:
  models a market characteristic for each of a plurality of market participants for a type of product over a plurality of time periods;
  derives variability of an attribute corresponding to a market characteristic coefficient of the type of product for each of the plurality of market participants, wherein deriving variability of the attribute includes de-trending an average attribute time series associated with historical data for each of the plurality of market participants;
  recursively samples from a distribution of the variability of the attribute for each of the plurality of market participants;
  determines a pseudo-attribute by adding the recursively sampled attribute to a trend of the attribute;
  remodels the market characteristic for each of the plurality of market participants for the type of product using the pseudo-attribute as an input to the modeled market characteristic; and
  forecasts a future market characteristic for at least an additional time period for each of the plurality of market participants for the type of product according to the remodeled market characteristic.

15. The system of claim 14, wherein:
the memory resources store historical data including the market characteristic of the plurality of market participants for at least a portion, of the plurality of time periods;
the market model builder stores a market model in the memory resources;
the market model builder remodels the stored market model; and
the market model builder forecasts the future market characteristic according to the stored market model.

16. The system of claim 15, wherein the computing device includes a network interface coupled to the one or more processors, and wherein the computing device communicates the stored market model to a remote location through the network interface.

17. The system of claim 16, wherein the remote location comprises a client computing device coupled to the network interface via a network, and wherein the client computing device includes a display to display the stored market model.

18. The system of claim 14, wherein the market characteristic comprises one or more of market share and market size.

19. The system of claim 14, wherein the market model builder:
- derives variability of the attribute including determining a trend of the attribute for each of the plurality of market participants;
- determines the trend includes applying a linear regression to the average attribute time series; and
- recursively samples from the distribution of the variability of the attribute for each of the plurality of market participants including:
  - calculating a difference between the trend of the attribute and the average attribute time series; and
  - bootstrapping from the difference between the trend of the attribute and the average attribute time series.

20. The system of claim 14, wherein the market model builder:
- derives variability of the attribute including determining a trend of the attribute for each of the plurality of market participants;
- determines the trend includes using a Holt-Winters algorithm; and
- recursively samples from the distribution of the variability of the attribute for each of the plurality of market participants including:
  - calculating a standard deviation between the average attribute time series associated with historical data and the trend of the attribute;
  - calculating a mean between the average attribute time series associated with historical data and the trend of the attribute;
  - calculating a sum by adding the mean to the standard deviation;
  - imposing a Gaussian distribution on the sum; and
  - parametrically sampling from the Gaussian distribution.

* * * * *

UNITED STATES PATENT AND TRADEMARK OFFICE
CERTIFICATE OF CORRECTION

PATENT NO. : 8,374,904 B2
APPLICATION NO. : 12/946367
DATED : February 12, 2013
INVENTOR(S) : Jerry Z. Shan Page 1 of 1

It is certified that error appears in the above-identified patent and that said Letters Patent is hereby corrected as shown below:

In the Claims:

In column 13, line 55, in Claim 15, delete "portion," and insert -- portion --, therefor.

Signed and Sealed this
Twenty-first Day of May, 2013

Teresa Stanek Rea
*Acting Director of the United States Patent and Trademark Office*